United States Patent
Horiguchi

(10) Patent No.: US 10,222,786 B2
(45) Date of Patent: Mar. 5, 2019

(54) NUMERICAL CONTROL SYSTEM HAVING SYNCHRONOUS CONTROL FUNCTION BETWEEN UNITS

(71) Applicant: FANUC CORPORATION, Minamitsuru-gun, Yamanashi (JP)

(72) Inventor: Kouichirou Horiguchi, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 246 days.

(21) Appl. No.: 15/277,160

(22) Filed: Sep. 27, 2016

(65) Prior Publication Data

US 2017/0090464 A1 Mar. 30, 2017

(30) Foreign Application Priority Data

Sep. 28, 2015 (JP) .................................. 2015-189946

(51) Int. Cl.
G05B 19/414 (2006.01)

(52) U.S. Cl.
CPC ............ *G05B 19/4141* (2013.01); *G05B 2219/33215* (2013.01); *G05B 2219/33342* (2013.01); *G05B 2219/34015* (2013.01)

(58) Field of Classification Search
CPC ........... G05B 2219/33215; G05B 2219/33342; G05B 2219/34015
USPC .......................................................... 700/3
See application file for complete search history.

(56) References Cited

U.S. PATENT DOCUMENTS

| | | | | |
|---|---|---|---|---|
| 9,882,569 B2* | 1/2018 | Kadota | ................. | G09G 3/3685 |
| 2006/0251046 A1* | 11/2006 | Fujiwara | ............... | H04J 3/0652 |
| | | | | 370/350 |
| 2012/0134428 A1* | 5/2012 | Bobrek | ..................... | H04B 3/00 |
| | | | | 375/258 |
| 2013/0077659 A1 | 3/2013 | Okuda | | |
| 2013/0182806 A1* | 7/2013 | Obradovic | ............ | H04J 3/0673 |
| | | | | 375/356 |
| 2015/0304193 A1 | 10/2015 | Ishii et al. | | |

FOREIGN PATENT DOCUMENTS

| | | |
|---|---|---|
| JP | 3386777 B2 | 1/2003 |
| JP | 2006107050 A | 4/2006 |
| JP | 2007-089331 A | 4/2007 |

(Continued)

OTHER PUBLICATIONS

Notification of Reasons for Refusal for Japanese Application No. 2015-189946, dated Mar. 20, 2018 with translation, 10 pages.

(Continued)

*Primary Examiner* — Robert E Fennema
*Assistant Examiner* — Jigneshkumar C Patel
(74) *Attorney, Agent, or Firm* — RatnerPrestia

(57) ABSTRACT

A master unit that controls a master axis and a slave unit that controls a slave axis are connected via a communication path to construct a numerical control system. The slave unit acquires a reception time of synchronization information received from the master unit and records a history of the reception time of the synchronization information. Then, when retransmission of transfer of the synchronization information is detected, the slave unit corrects the reception time of the synchronization information based on history data of the reception time and corrects asynchronous position of the slave axis based on a corrected reception time.

6 Claims, 7 Drawing Sheets

(56) References Cited

FOREIGN PATENT DOCUMENTS

| | | |
|---|---|---|
| JP | 2007213474 A | 8/2007 |
| JP | 2008146149 A | 6/2008 |
| JP | 2009279608 A | 12/2009 |
| JP | 2013074527 A | 4/2013 |
| JP | 2013222403 A | 10/2013 |
| JP | 2014202734 A | 10/2014 |
| JP | 2015004649 A | 1/2015 |

OTHER PUBLICATIONS

Notification of Reasons for Refusal for Japanese Application No. 2015-189946, dated Oct. 31, 2017, including English translation, 5 pages.

* cited by examiner

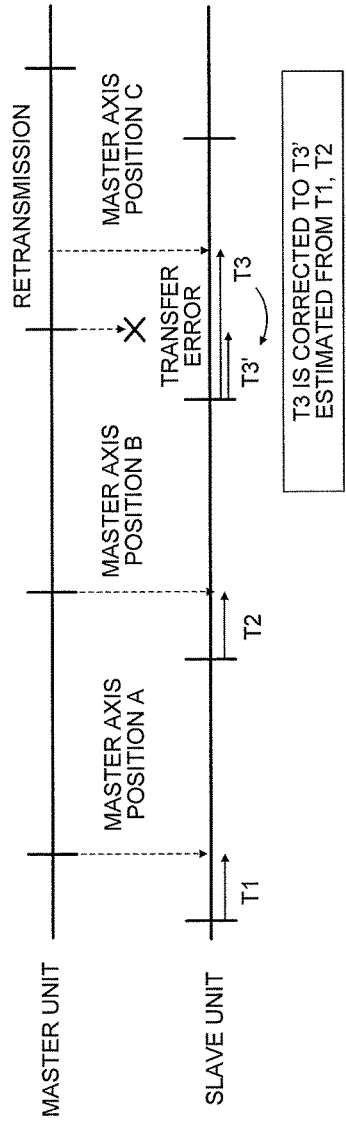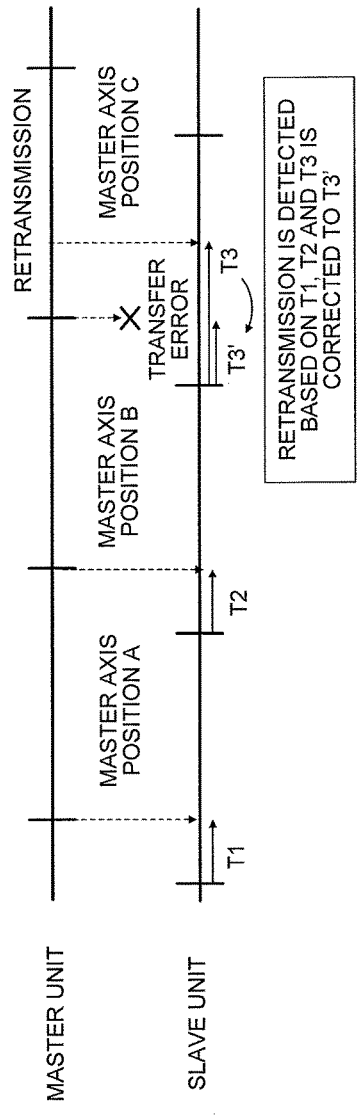

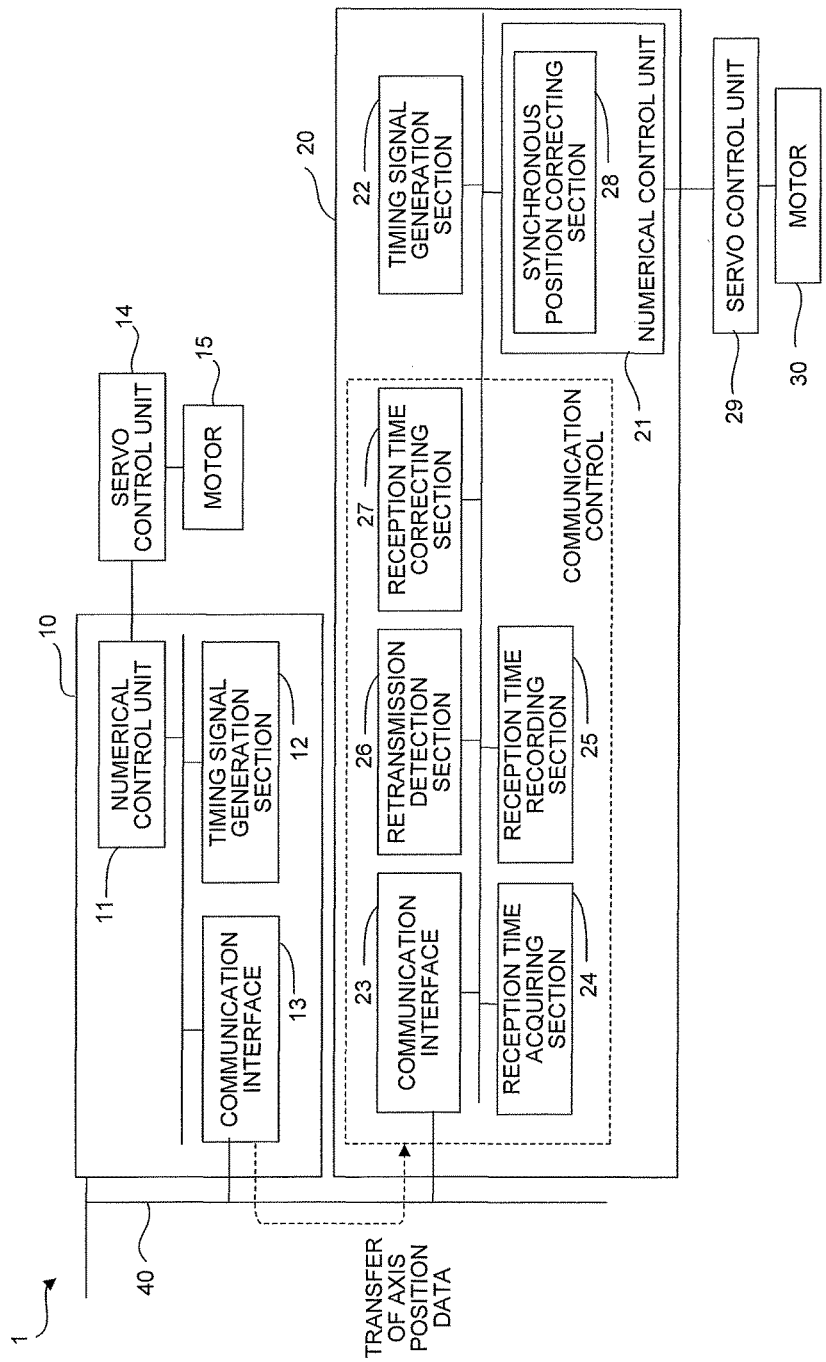

US 10,222,786 B2

NUMERICAL CONTROL SYSTEM HAVING SYNCHRONOUS CONTROL FUNCTION BETWEEN UNITS

BACKGROUND OF THE INVENTION

1. Field of the Invention

The present invention relates to a numerical control system, and in particular, relates to a numerical control system capable of maintaining synchronization accuracy in synchronous control between numerical controllers.

2. Description of the Related Art

If, in a machine in which many axes need to be synchronized such as a printing machine, the number of axes to be synchronized is not sufficient for the number of control axes of one numerical controller, two or more numerical controllers are connected by a communication path and axes to be controlled of each numerical controller are synchronized. When synchronous control of a plurality of numerical controllers is performed in such a synchronous control system, axes in a synchronous relationship are each set as a master axis and a slave axis, a numerical controller to control an axis to be a master axis is called a master unit, a numerical controller to control an axis to be a slave axis is called a slave unit, and the master unit and the slave unit are connected by a bus or a network. Then, the master unit transfers information for synchronization (synchronization information) to the slave unit in accordance with the control period to synchronize the slave axis with the master axis. On the other hand, the slave unit performs synchronous control of the slave axis based on synchronization information transferred from the master unit (FIG. 8).

Incidentally, each numerical controller has an individual clock and the time is clocked for each numerical controller. Thus, if clocks are not set among a plurality of numerical controllers for which the synchronous control is performed, the master unit and the slave unit have different time information and cannot correctly perform synchronous control. Therefore, it is necessary to perform synchronous control while correcting a lag of time information of the clock held by each numerical controller.

The lag of time information can be determined from a phase difference between the generation timing of a bus cycle generated in the slave unit in response to reception of transfer data from the master unit and the start timing of the control period of the slave unit. When axes controlled by the master unit and the slave unit are synchronized using the technology, information about control of the master axis is transferred from the master unit to the slave unit in predetermined timing in the control period and the slave unit can determine a lag of the clocks of the master unit and the slave unit from the received time to correct the information about control of the master axis and output a synchronization command to the slave axis based on the corrected axis information of the master axis (such as Japanese Patent Application Laid-Open No. 2007-89331).

If a transfer error occurs under the influence of, for example, noise in the data transfer for synchronization between the master unit and the slave unit, data is retransmitted, but if data is retransmitted, transfer data may not be transferred at regular intervals so that the time interval between the determined timing for the master unit to transfer and the reception of data by the slave unit increases. Then, the slave unit cannot detect a lag of the time information between the master unit and the slave unit and makes corrections based on the erroneous time information and therefore, the slave unit cannot correctly correct control information of the master axis and as a result, causes a synchronization error, posing a problem of inviting degradation of synchronization accuracy.

SUMMARY OF THE INVENTION

An object of the present invention is to provide a numerical control system in which a numerical controller to be a master unit and a numerical controller to be a slave unit perform synchronous control of axes controlled by each numerical controller, wherein synchronization accuracy is maintained even if retransmission of transfer occurs.

A numerical control system according to the present invention includes a master unit and a slave unit that perform numerical control and are connected by a communication path. For performing synchronous control between the master unit and the slave unit, the master unit periodically transfers synchronization information to the slave unit and, on the other hand, the slave unit performs the synchronous control based on the synchronization information transferred from the master unit. The slave unit includes: a reception time acquiring section for acquiring a reception time of the synchronization information; a reception time recording section for recording a history of the reception time of the synchronization information, as reception time history data; a retransmission detection section for detecting retransmission of transfer of the synchronization information; and a reception time correcting section for correcting the reception time of the synchronization information based on the reception time history data when the retransmission detection section detects the retransmission of the transfer of the synchronization information. And the slave unit is configured to perform the synchronous control based on the reception time corrected by the reception time correcting section.

The retransmission detection section may be configured to detect the retransmission of the transfer based on the reception time history data.

The retransmission detection section may be configured to detect the retransmission based on retransmission information added when the master unit retransmits the synchronization information.

The master unit may be configured to transfer the synchronization information with information on a transmission delay time from generation of the synchronization information to transmission thereof added, and the reception time acquiring section may be configured to correct the reception time based on the information on the transmission delay time.

According to a numerical control system in the present invention, synchronization accuracy can be maintained by correcting a delay due to retransmission of transfer data. Also, when the master unit and the slave unit are connected via a repeater or the like, even if data transfer is delayed in accordance with operating conditions of the repeater in some cases, synchronization accuracy can be maintained by correcting the delay.

BRIEF DESCRIPTION OF THE DRAWINGS

The above object and other objects and the feature of the present invention will be apparent from the description below with reference to appended drawings. Among these drawings:

FIG. 3 is a diagram illustrating an overview of synchronous control performed by a numerical control system according to the present invention;

FIG. 4 is a schematic block diagram of the numerical control system according to an embodiment of the present invention;

FIG. 5 is a diagram illustrating estimation of retransmission of synchronization information using reception time history data recorded in the numerical control system in FIG. 4;

DETAILED DESCRIPTION OF THE PREFERRED EMBODIMENTS

First, before illustrating the operation principle of the present invention, the synchronous control system described in Japanese Patent Application Laid-Open No. 2007-89331 as the prior art described above will be described.

The synchronous control system includes a controller to be a master unit and a controller to be a slave unit, each of the master unit and the slave unit periodically generates a timing signal, and synchronous control is performed by transferring the position of the master axis to the slave axis based on the timing signal of the master unit.

In the synchronous control system as described above, the slave unit receives information of the position of the master axis and acquires the time elapsed from the timing signal of the slave unit as the reception time thereof. Then, the position of the master axis and the reception time are recorded. The master unit and the slave unit have timing signals generated in the respective units and control the axes based on these timing signals and thus, the time base of control of the master unit and the slave unit (or the time base in which the timing signal is time unit) are deviated and if an attempt is made to directly synchronize the slave axis with the position of the master axis transferred from the master unit, the slave axis goes out of synchronization by an amount corresponding to the deviation on the time base.

Figure 1:
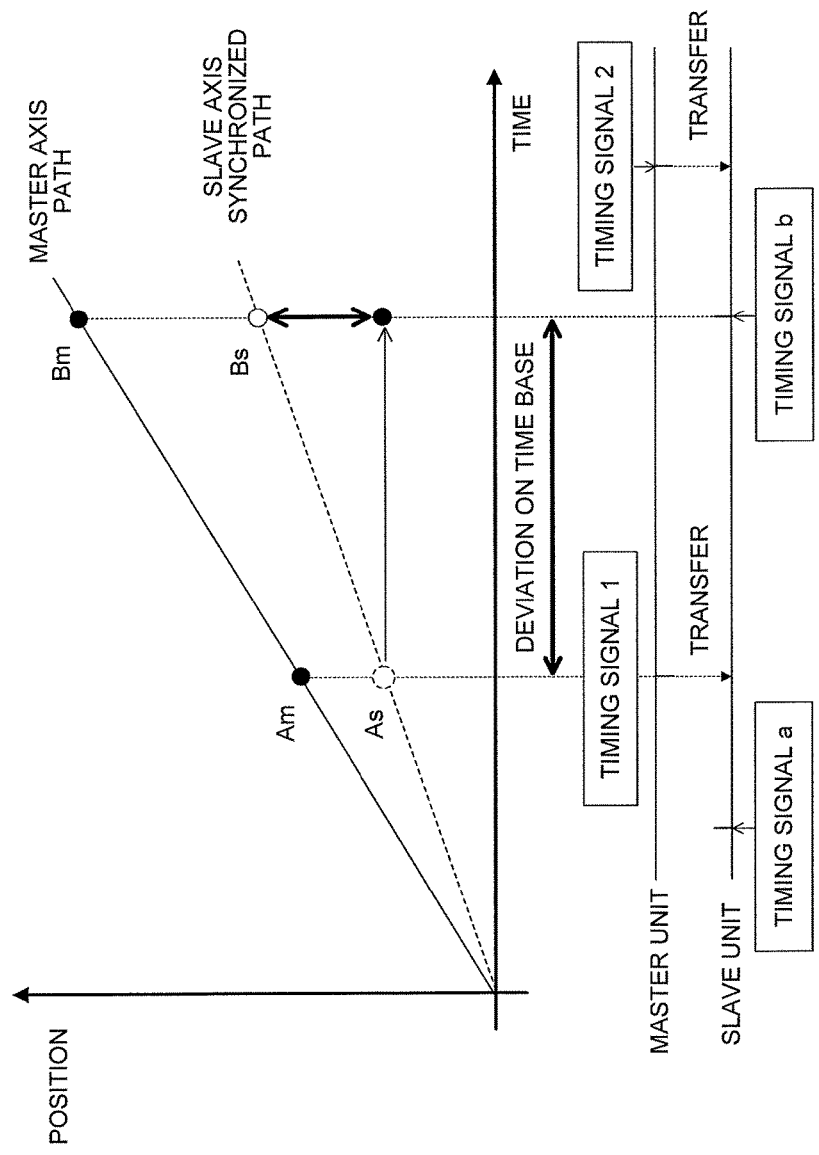
FIG. 1 is a diagram illustrating a synchronization error between a master axis and a slave axis on the basis of a deviation on a time base between a master unit and a slave unit in a synchronous control system.

FIG. 1 is a diagram illustrating a synchronization error between a master axis and a slave axis based on a deviation on a time base between a master unit and a slave unit in a synchronous control system.

In FIG. 1, the master unit issues commands to the master axis based on timing signals 1, 2 generated inside the master unit and transfers information of the position of the master axis to the slave unit together with each timing signal. On the other hand, the slave unit issues commands to the slave axis based on timing signals a, b generated inside the slave unit. Thus, the synchronization command of the slave unit for a position Am of the master axis transferred by the timing signal 1 is output by the timing signal b after the timing signal 1 is transferred due to a "deviation on the time base" of control.

Here, if the case where the slave axis attempts to directly synchronize with the position Am of the master axis is considered, the slave axis outputs such that the slave axis moves to a synchronous position As of the slave axis with respect to the position Am of the master axis at the time of the timing signal b, but at that time, the master axis has moved to a position Bm of the master axis. The synchronous position of the slave axis with respect to the position Bm of the master axis is a synchronous position Bs and thus, the slave axis causes a "synchronization error" by the difference between the synchronous position As and the synchronous position Bs. This becomes the synchronization error due to a deviation on a time base between the master unit and the slave unit.

Figure 2:
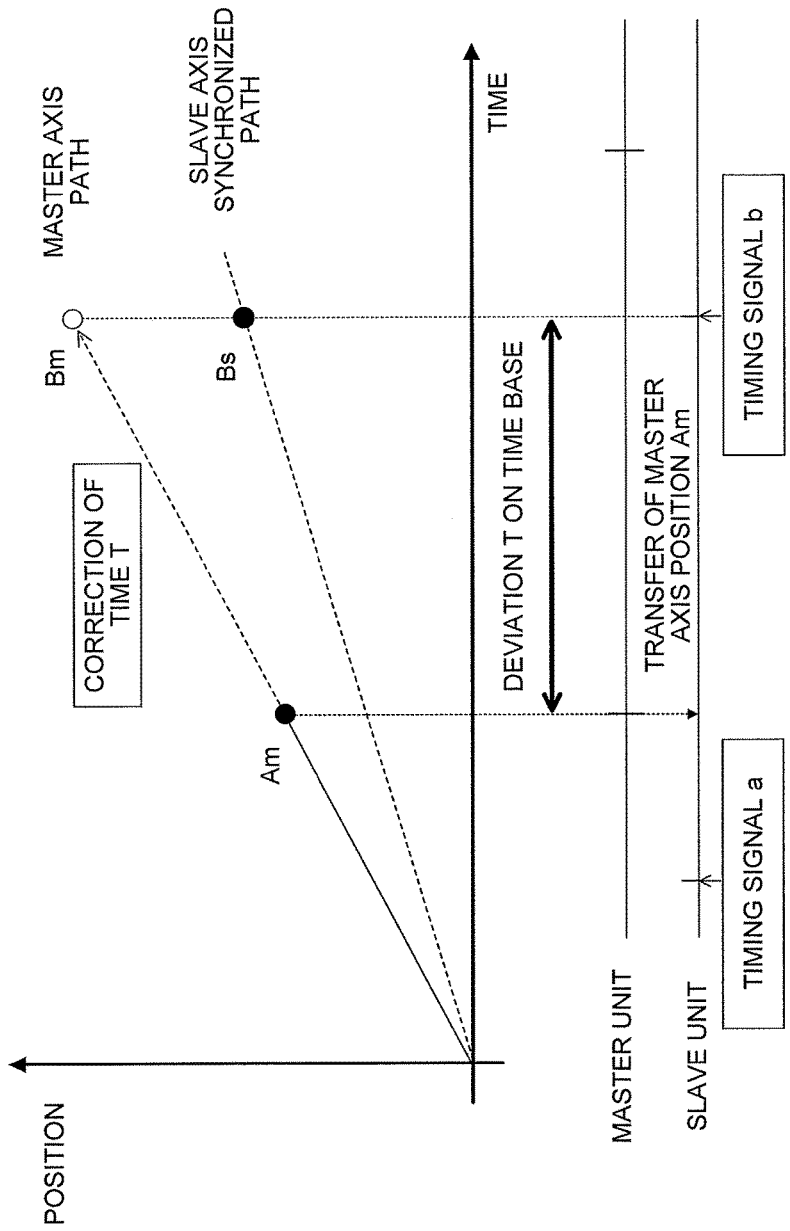
FIG. 2 is a diagram illustrating a basic technique to eliminate the synchronization error illustrated with reference to FIG. 1.

FIG. 2 is a diagram illustrating a basic technique to eliminate the synchronization error illustrated with reference to FIG. 1.

To eliminate the synchronization error, the slave unit corrects the received position of the master axis (position Am of the master axis) to the position of the command timing to the slave axis on the time base of the slave unit (position Bm of the master axis at the time of the timing signal b) and determines the synchronous position Bs of the slave axis for the corrected position to issue a synchronization command to the slave axis. Here, to correct the received position of the master axis to the position on the time base of the slave unit, the position after a "lag time T on the time base" is estimated by assuming that the current master axis moves at a constant speed.

Here, when a transfer (transmission) error of data is detected in communication via a network, the same data is retransmitted. Also, in the synchronous control system described above, when a master unit detects a transfer error of data which is transferred periodically, the master unit retransmits the same data. When positional information of the master axis is retransmitted ("transfer of the position Am of the master axis"), the slave unit calculates an estimated position of the master axis from the reception time of the retransmitted data and thus, correct estimation cannot be expected and a synchronization error occurs, thereby inviting degradation of synchronization accuracy.

Thus in the present invention, as shown in FIG. 3, the slave unit detects retransmission of positional information, corrects a current reception time T3 from recorded past reception times T1, T2, and calculates, from the corrected reception time T3', the position of the master axis on the time base of the slave unit, and issues a synchronization command to the slave axis in accordance with the calculated position, thereby maintaining the synchronization accuracy.

FIG. 4 is a schematic block diagram of the numerical control system according to an embodiment of the present invention. FIG. 4 depicts only main components to perform synchronous control of the present invention.

A numerical control system 1 according to the present embodiment includes a master unit 10 as a numerical controller to control the master axis, a slave unit 20 as a numerical controller to control the slave axis, and a communication path 40 to transmit and receive data between the master unit 10 and the slave unit 20.

The master unit 10 includes a numerical control unit 11 that controls a motor 15 (such as the master axis) via a servo control unit 14, a timing signal generation means 12 for generating a timing signal used for synchronous control, and a communication interface 13 that communicates with the slave unit 20 via the communication path 40.

The numerical control unit 11 creates movement command data by performing processing such as analysis and interpolation on a program read from a memory (not shown) and controls the master axis by outputting the created movement command data.

The timing signal generation means 12 periodically generates a reference timing signal for synchronous control with the slave unit 20 using a clock contained in the CPU (not shown) or a clock output from another clock generator (not shown) provided in the master unit 10. The generation period of a timing signal is determined by the design and set to the period of, for example, 10 milliseconds.

The numerical control unit 11 outputs movement command data to the servo control unit 14 in the timing in which a timing signal is output from the timing signal generation means 12 and also transfers synchronization information containing the axis position of the master axis and the like moved by the movement command data to the slave unit 20 via the communication interface 13.

The slave unit 20 includes a numerical control unit 21 that controls a motor 30 (such as the slave axis) via a servo control unit 29, a timing signal generation means 22 for generating a timing signal used for synchronous control, and a communication interface 23 that communicates with the master unit 10 via the communication path 40. The slave unit 20 also includes a reception time acquiring section 24, a reception time recording section 25, a retransmission detection section 26, and a reception time correcting section 27 as communication control means including the communication interface 23 and further includes a synchronous position correcting section 28 inside the numerical control unit 21.

The numerical control unit 21 creates movement command data by performing processing such as analysis and interpolation on a program read from a memory (not shown) and controls the slave axis by outputting the created movement command data.

The timing signal generation means 22 is similar to the timing signal generation means 12 provided in the master unit 10 and periodically generates a reference timing signal for synchronous control with the master unit 10 using a clock contained in the CPU (not shown) or a clock output from another clock generator (not shown) provided in the slave unit 20. The generation period of a timing signal may be the same as the generation period of a timing signal by the timing signal generation means 12 of the master unit 10 or a period that is not the same, for example, integral multiples or integral divisions thereof. To simplify the description below, it is assumed that the generation period of a timing signal by the timing signal generation means 22 is the same as the generation period of a timing signal by the timing signal generation means 12.

The numerical control unit 21 outputs movement command data in which the position is corrected by the synchronous position correcting section 28 described below to the servo control unit 29 in the timing in which a timing signal is output from the timing signal generation means 22.

When the slave unit 20 receives synchronization information such as axis position data transferred from the master unit 10, the reception time acquiring section 24 acquires the time elapsed from previous output of the timing signal by the timing signal generation means 22 to the time point at which the synchronization information is received, as a "reception time". For example, the reception time acquiring section 24 may read the value of a timer counter prepared as a timer counter configured to be reset by a timing signal output from the timing signal generation means 22, when synchronization information is received, or may subtract the time at which synchronization information is received, from the time at which a timing signal is output from the timing signal generation means 22, which is temporarily stored in a memory or the like, using RTC or the like contained in the slave unit 20.

The reception time recording section 25 records a history of the reception time of synchronization information acquired by the reception time acquiring section 24 in a memory (not shown), as reception time history data. The reception time recording section 25 which records the reception time history data may record all reception times from the start of control operation, and may also record only a predetermined number of reception times in consideration of the amount of memory or the like of the slave unit 20.

The retransmission detection section 26 checks if synchronization information transferred from the master unit 10 is retransmitted, and when retransmission is detected, the retransmission detection section 26 instructs the reception time correcting section 27 to correct the reception time of the retransmitted synchronization information.

As an example of method for checking retransmission of synchronization information, estimating retransmission using reception time history data recorded by the reception time recording section 25 may be adopted. FIG. 5 is a diagram showing a method of detecting retransmission using reception time history data.

Here, as shown in FIG. 5, assumed is a case where a reception time T1 when synchronization information concerning a "master axis position A" is received and a reception time T2 when synchronization information concerning a "master axis position B" is received are recorded as reception time history data, a transfer error occurs when synchronization information concerning a "master axis position C" is transferred, and the synchronization information is retransmitted by the master unit 10.

In this case, a reception time T3 when synchronization information concerning a "master axis position C" is received is a value larger than the reception times T1, T2 by the time required for retransmission. Thus, the average value of the past reception times T1, T2 recorded in the reception time history data and the latest reception time T3 are compared with each other, and if the difference the average value and the reception time T3 exceeds a tolerance Th, then it can be estimated that synchronization information is retransmitted, thereby enabling detection of retransmission. At this point, a predefined constant may be used as the tolerance Th, or a value obtained by multiplying the retransmission time defined by the communication protocol used for communication between the master unit 10 and the slave unit 20 by a fixed ratio may be used as the tolerance Th. Also, the tolerance Th may be specified based on the variance of past reception times. Further, the retransmission can be estimated by a statistical test using statistics determined from past reception times.

Figure 6:
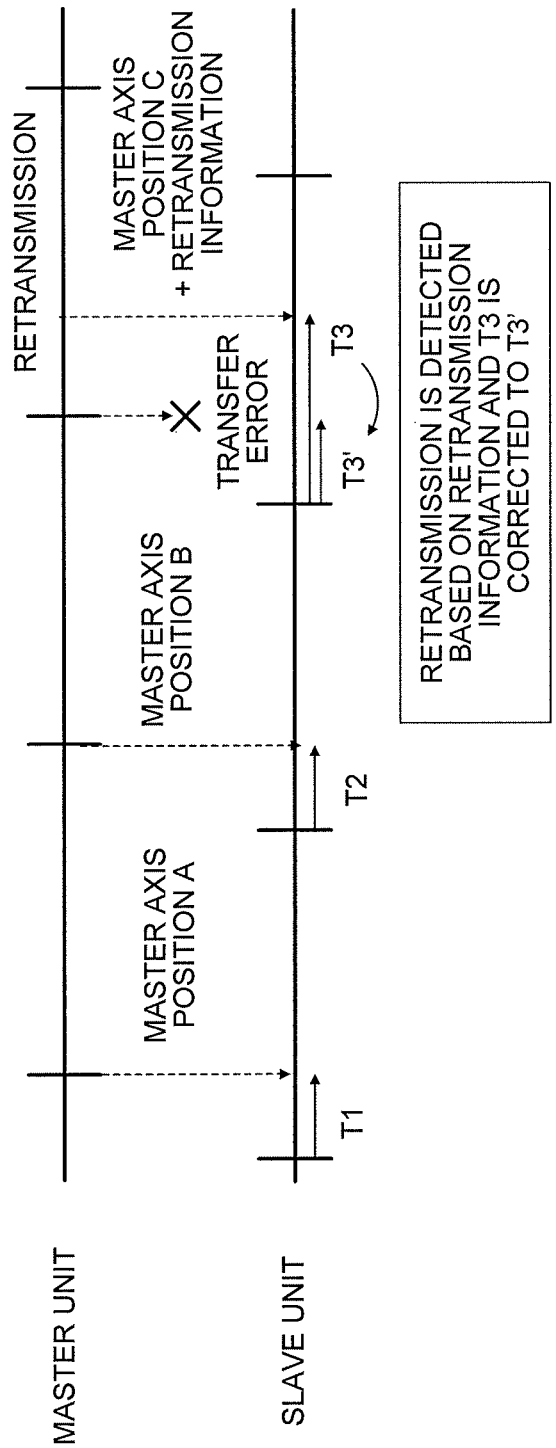
FIG. 6 is a diagram illustrating detection of retransmission of synchronization information by adding retransmission information to the master unit side in the numerical control system in FIG. 4 when synchronization information is retransmitted due to a transfer error.

As another method of detecting retransmission of synchronization information, as shown in FIG. 6, when synchronization information is retransmitted due to a transfer error, retransmission information indicating that the retransmitted synchronization information is due to retransmission may be added to the side of the master unit 10. In this manner, the retransmission detection section 26 can detect retransmission by simply determining whether or not retransmission information is added to synchronization information.

Returning to FIG. 4, when a correction command of the reception time is received from the retransmission detection section 26, the reception time correcting section 27 corrects the reception time of the synchronization information received this time using reception time history data recorded by the reception time recording section 25. In the correction, for example, the average value at reception times of a predetermined number in the past recorded as reception time history data may be used or the retransmission time of synchronization information determined by the communication protocol or the like may be subtracted from the reception time of the synchronization information received this time.

The synchronous position correcting section 28 corrects the synchronous position of the slave axis in the timing in which a timing signal is output from the timing signal generation means 22 by the method described with reference to FIG. 2, based on the reception time corrected by the reception time correcting section 27. Then, the numerical control unit 21 outputs movement command data to a machine such that the slave axis is in a synchronous position corrected by the synchronous position correcting section 28 in the timing in which a timing signal is output from the timing signal generation means 22.

With the above configuration, synchronization accuracy can be maintained by correcting a delay due to retransmission of transfer data.

In the foregoing, although the embodiments of the present invention have been described, the present invention is not limited to only the aforementioned embodiments and can be implemented in various forms by making appropriate modifications.

Figure 7:
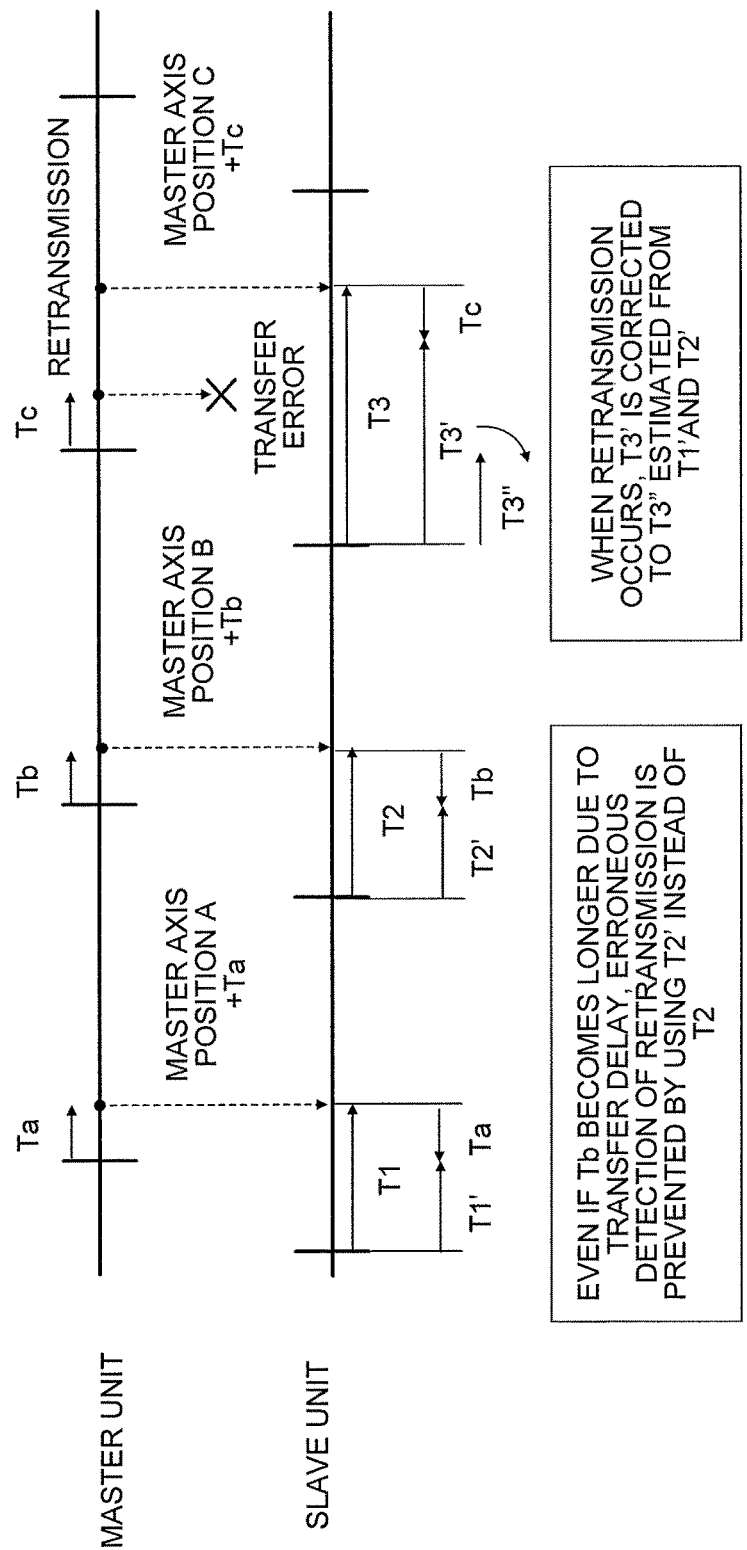
FIG. 7 is a diagram illustrating an operation (transferring of information of measured transmission delay time with synchronization information added, to the slave unit) of the numerical control system according to another embodiment of the present invention.
Figure 8:
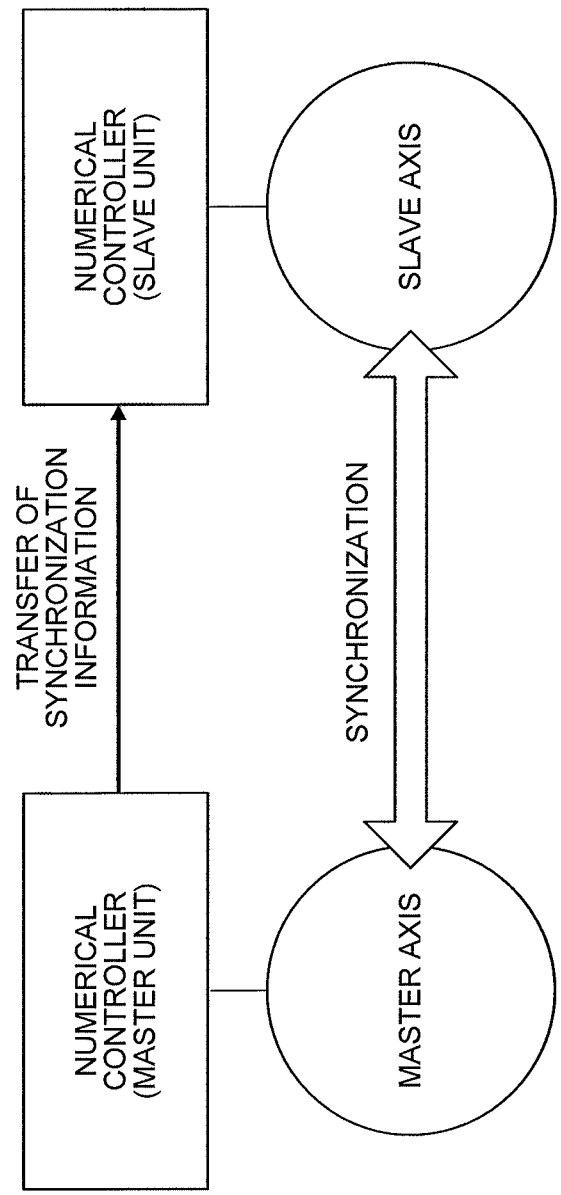
FIG. 8 is a diagram illustrating a common operation in the synchronous control system.

For example, in case where, when the timing signal generation means 12 in the master unit 10 generates a timing signal, the master unit 10 cannot transfer data immediately, as shown in FIG. 7, transmission delay times Ta, Tb, Tc from the generation of a timing signal to the transmission of data may be measured in advance and information on the measured transmission delay times may be transferred to the slave unit 20 with the synchronization information added. At this point, even if synchronization information is retransmitted by the master unit 10, the time Tc up to the first transfer in which a transfer error occurs is added at the time of retransmission.

If configured in this manner, in the slave unit 20, the reception time acquiring section 24 determines deviations T1', T2', T3' on the time base between the units by subtracting the transmission delay times Ta, Tb, Tc from the reception times T1, T2, T3. The calculated times T1', T2', T3' correspond to T1, T2, T3 in FIG. 3, respectively, and synchronization accuracy can be maintained without being affected by a transfer processing delay in the master unit 10.

Also, the master unit and the slave unit constituting a synchronous control system need to have each at least one unit and the number of master units and the number of slave units are not limited. For example, no problem arises if a plurality of slave units are provided for one master unit or one slave unit is provided for a plurality of master units.

Further, the master unit and the slave unit may be connected via a repeater or the like. In such a case, even if data transfer is delayed in accordance with operating conditions of the repeater, the slave unit 20 can maintain synchronization accuracy by correcting the delay thereof.

The invention claimed is:

1. A numerical control system comprising:
    a master unit controlling a master axis of a machine tool; and
    a slave unit controlling a slave axis of the machine tool, the slave unit connected to the master unit by a communication path, wherein, for synchronizing movement of the machine tool on the master axis with movement of the machine tool on the slave axis, the master unit periodically transfers synchronization information including position of the machine tool on the master axis to the slave unit, and the slave unit performs the synchronous control based on the synchronization information transferred from the master unit,
    wherein the slave unit is configured to:
        acquire a reception time of the synchronization information received from the master unit, the reception time is a time interval between output of a timing signal generated in the slave unit at a predetermined period and reception of the synchronization information,
        record a history of the reception time of the synchronization information, as reception time history data,
        detect retransmission of transfer of the synchronization information,
        correct the reception time of the synchronization information with a correction amount based on the reception time history data when the slave unit detects the retransmission of the transfer of the synchronization information, the correction amount corresponding to a delay due to the retransmission of the synchronization information, and
        compute an estimated position of the machine tool on the master axis based on the synchronization information and the reception time corrected by the slave unit, and control a position of the machine tool on the slave axis based on the estimated position.

2. The numerical control system according to claim 1, wherein the slave unit is configured to detect the retransmission of the transfer based on the reception time history data.

3. The numerical control system according to claim 1, wherein the slave unit is configured to detect the retransmission based on retransmission information added when the master unit retransmits the synchronization information.

4. The numerical control system according to claim 1, wherein the master unit is configured to transfer the synchronization information with information on a transmission delay time from generation of the synchronization information to transmission thereof added, and
    the slave unit is configured to correct the reception time based on the information on the transmission delay time.

5. The numerical control system according to claim 2, wherein the master unit is configured to transfer the synchronization information with information on a transmission delay time from generation of the synchronization information to transmission thereof added, and
    the slave unit is configured to correct the reception time based on the information on the transmission delay time.

6. The numerical control system according to claim 3, wherein the master unit is configured to transfer the synchronization information with information on a transmission delay time from generation of the synchronization information to transmission thereof added, and
    the slave unit is configured to correct the reception time based on the information on the transmission delay time.

* * * * *